United States Patent [19]

Wilson

[11] 4,005,784
[45] Feb. 1, 1977

[54] TRANSPORT VEHICLE

[76] Inventor: Leslie Henry Wilson, 28 Gould Street, Frankston, Victoria, Australia

[22] Filed: Feb. 26, 1975

[21] Appl. No.: 553,163

[30] Foreign Application Priority Data

Feb. 28, 1974  Australia .................... 6767/74

[52] U.S. Cl. ................ 214/6 B; 214/394; 214/515
[51] Int. Cl.² ......................................... B65G 57/32
[58] Field of Search .......... 214/6 B, 514, 394, 396, 214/501, 515

[56] References Cited
UNITED STATES PATENTS

| | | | |
|---|---|---|---|
| 3,415,399 | 12/1968 | Nunes, Jr. .................... | 214/6 B |
| 3,450,281 | 6/1969 | Groberg ....................... | 214/501 |
| 3,501,025 | 3/1970 | Jay et al. ..................... | 214/6 B |
| 3,666,128 | 5/1972 | Shimizu ....................... | 214/514 |
| 3,698,534 | 10/1972 | Hadfield ...................... | 214/6 B |
| 3,877,584 | 4/1975 | Holcombe ..................... | 214/6 B |

*Primary Examiner*—Robert J. Spar
*Assistant Examiner*—Ross Weaver
*Attorney, Agent, or Firm*—Cushman, Darby & Cushman

[57] ABSTRACT

A transport vehicle comprises a rigid rectangular frame which is open at one end, a vertically movable load supporting floor and a longitudinally extending conveyor supported on and near the top of a side wall of the frame.

A transverse conveyor extends across the top of the frame near the level of the longitudinal conveyor and deflector means may be provided to transfer articles from the latter to the former. Thus hay bales picked up in the field and delivered to the longitudinal conveyor may be distributed over the floor and after one complete layer of bales is formed, the floor may be lowered to enable a second layer to be similarly formed on the first layer and so on to form a stack on the floor. The frame is preferably open at the bottom to enable the floor to be lowered until it rests on the ground and the vehicle may be provided with pusher means by which the stack may be pushed from the floor onto the ground. Preferably however the floor after being lowered onto the ground may be detached from the vehicle so that the latter may then be moved forwardly away from the floor and the stack thereon. Means are also preferably provided for subsequently pulling the floor forwardly into register with the vehicle and during this operation the stack may abut against closed doors on the open end of the vehicle whereby the stack is progressively pushed from the floor.

5 Claims, 9 Drawing Figures

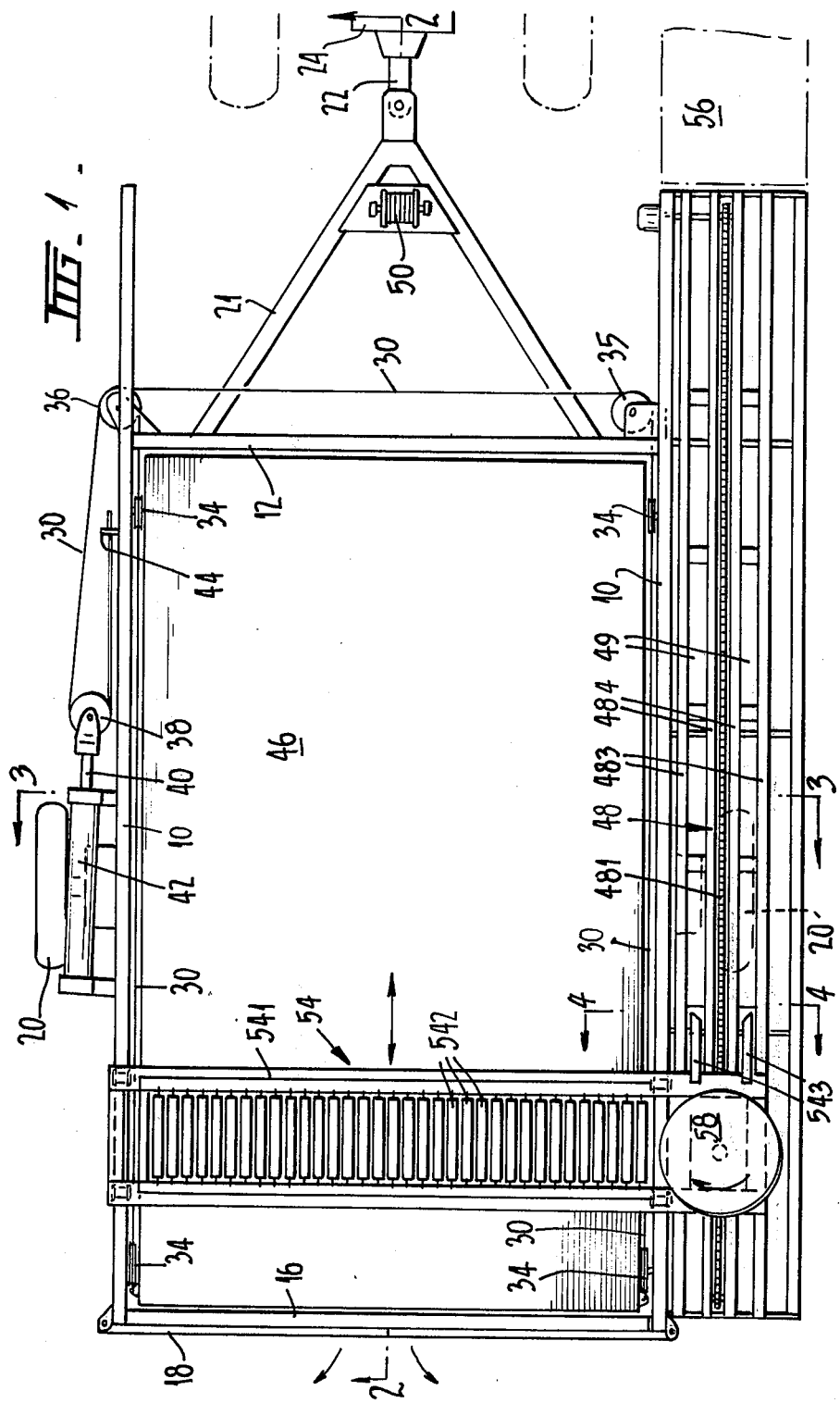

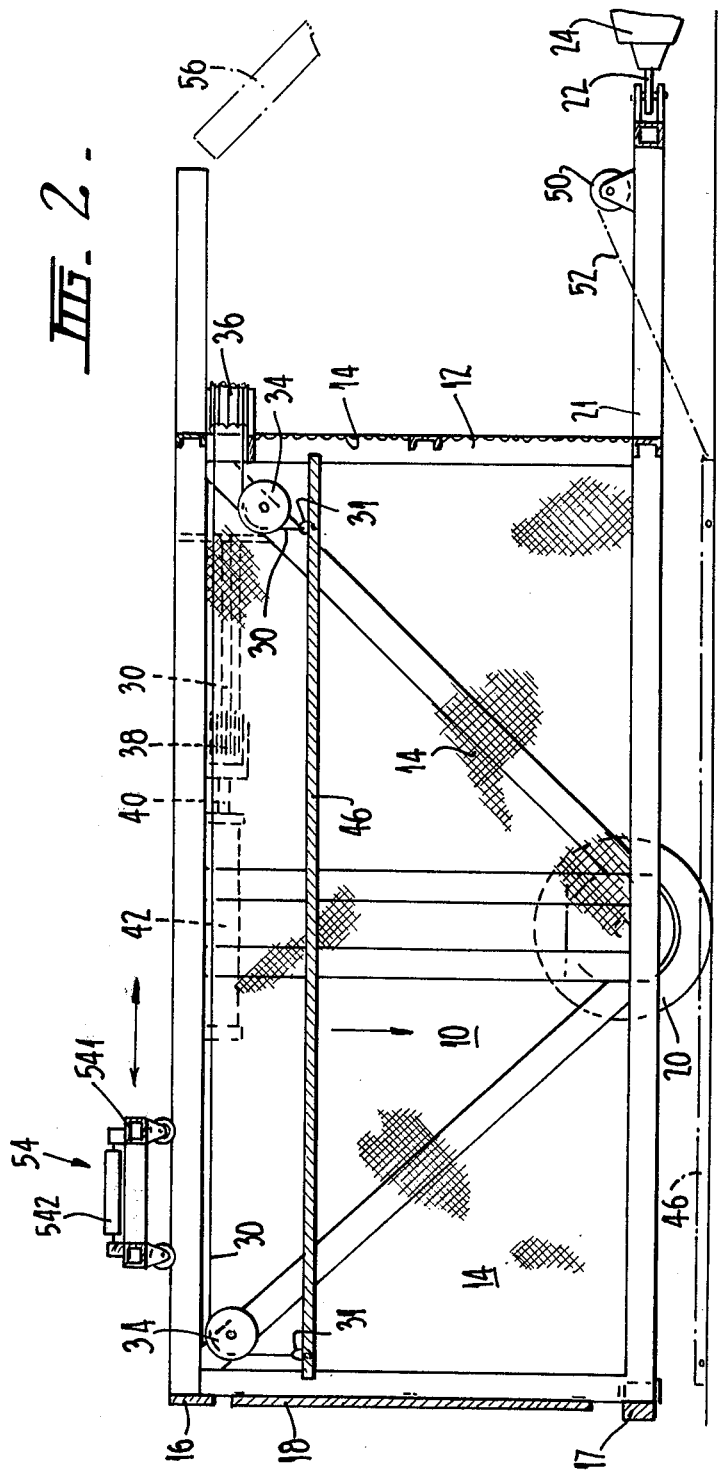

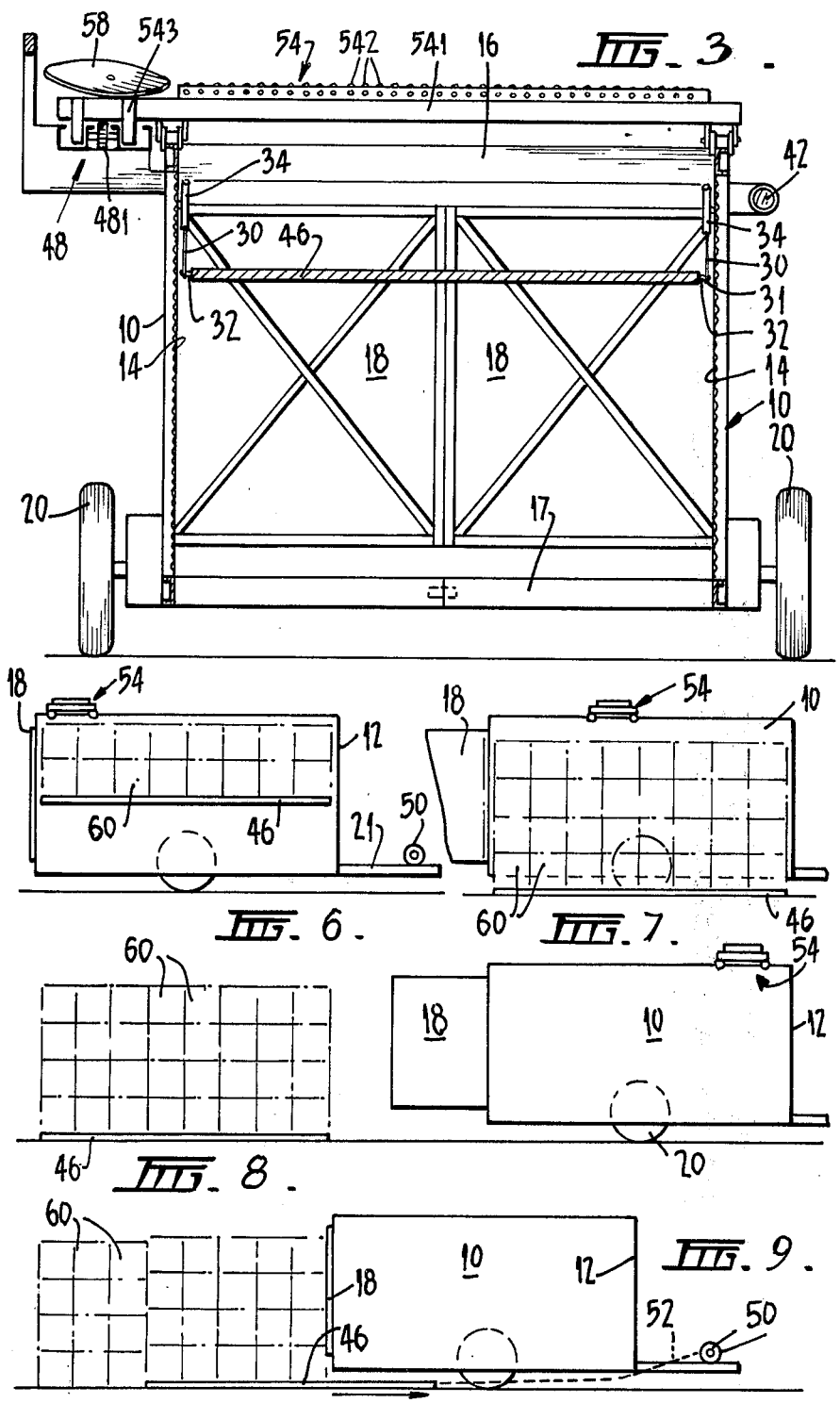

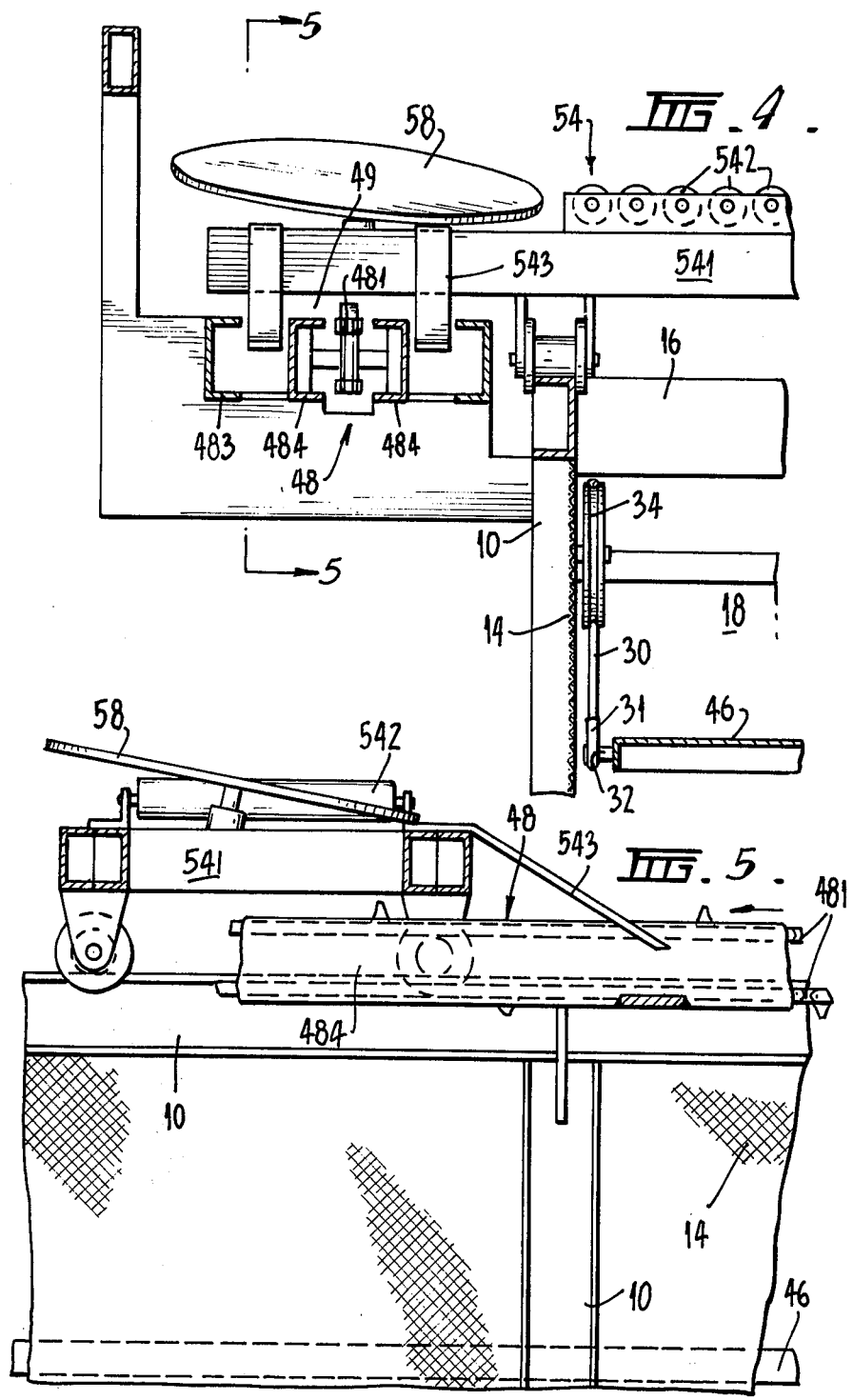

TRANSPORT VEHICLE

This invention relates to vehicles for the transport of goods, particularly bales of hay or other materials.

A considerable proportion of the hay at present produced, is formed into compact retangular bales by mobile baling machines which gather the hay from windrows and form it into bales which are then successively discharged onto the ground along the path of the machine. It is highly desirable that the bales which are thus scattered over the field, should be gathered and stored in stacks or sheds as, when left in the field exposed to the weather, the hay deteriorates and if saturated by rain is apt to become unusable.

However, the operations of gathering and storing the bales are time consuming, arduous and increasingly expensive with such facilities as are at present available, so that in many cases, the bales are left lying in the field with resultant considerable losses.

It is therefore the object of this invention to provide improved transport vehicles adapted, among other things, to facilitate the operations of picking up, transporting and discharging bales of hay or the like.

Accordingly, this invention provides a transport vehicle having a rigid body of generally rectangular form which is open at one end and which comprises spaced side walls and an end wall, and including a vertically movable floor, means operable to raise and lower the floor within the body and a substantially horizontal longitudinally extending conveyor at or near the top of the body to facilitate the distribution of bales or other articles over the floor.

A transversely disposed conveyor is also preferably provided on the vehicle to receive the bales or other articles from the longitudinal conveyor and convey them laterally to required positions. Thus, the bales or the like may be readily distributed both longitudinally and laterally over the floor and supported thereon in a plurality of layers or tiers.

For this purpose, the said longitudinal conveyor is preferably arranged adjacent to one side wall of the vehicle in which case the transverse conveyor extends laterally therefrom to or near the opposite side wall.

Preferably, the said transverse conveyor is also supported for forward and rearward movements within the vehicle for the convenient formation of successive transverse rows of the bales or the like.

In use, the said floor may be raised to its uppermost position at the commencement of each loading operation, the floor at this time being disposed at a convenient distance below the level of the said longitudinal and transverse conveyors. The bales or other articles are directed in turn onto one end of the longitudinal conveyor and are transferred therefrom to the transverse conveyor by deflector means or otherwise. Thus, an operator standing on the elevated floor or on a previously formed layer of bales may remove the successive bales from the transverse conveyor and arrange them in transverse rows.

After each transverse row is completed, the transverse conveyor is moved rearwardly or forwardly through a distance approximately equal to the width of the row to enable a second row to be formed in the same manner and so on.

When one complete layer or tier of bales or the like has been formed in this way, the floor together with the layer thereon is lowered through a distance equal to the depth of the row, to enable a second layer to be formed on the top of the first layer and so on until the loading operation is completed at which time the floor may be disposed close to the ground or other supporting surface.

For the purpose of discharging the bales at any required location, the vehicle may be provided with a transversely disposed pusher member which normally is disposed at or near the front or rear of the vehicle. This pusher member is guided for movements in the longitudinal direction of the vehicle and hydraulic or other means are provided for actuating it thereby to sweep the stacked bales or the like through the opposite end of the body.

Preferably, however, the frame of the vehicle is open at the bottom to permit the floor to be lowered until it rests on the ground in which case provision is made to enable the floor to be detached from the vehicle which, for this purpose, is either open, or capable of being opened, at one end to permit the vehicle to be moved clear of the floor and of the load thereon.

The floor may then be pulled longitudinally over the ground until it is again located below the vehicle and during this operation, the said open end of the vehicle is closed by doors or otherwise suitabe obstructed to serve as an abutment by which the stacked bales or the like are pushed over the rear end of the floor and onto the ground.

In order, however, that the invention may be more clearly understood, one construction of vehicle in accordance therewith is more fully described below with reference to the accompanying drawings in which:

FIG. 1 is a view in plan of a hay bale transport vehicle,

FIG. 2 is a view in sectional side elevation taken on the line 2—2 of FIG. 1,

FIG. 3 is a view in sectional end elevation taken on the line 3—3 of FIG. 1,

FIG. 4 is a view in sectional end elevation taken on line 4—4 of FIG. 1 showing conveyor transfer means and is drawn to a larger scale, FIG. 5 is a view in sectional side elevation taken on the line 5—5 of FIG. 4, and FIGS. 6 to 9 inclusive are diagrammatic views in side elevation and show successive stages in the loading and unloading of the transport vehicle.

Referring now to FIGS. 1 to 5 of the drawings, the body of the vehicle comprises rigid vertical side walls 10 and a rigid front wall 12, each of which is formed of suitably arranged and spaced structural members which are welded or otherwise rigidly secured together and each of these walls may, if desired, be lined with wire mesh 14 or the like.

The body formed by these rigidly connected side and front walls is completely open at the bottom and also at the rear except that the upper portions of the rear ends of the side walls are rigidly secured together by a transverse member 16 while also the lower portions of the rear ends of the side walls may normally be rigidly connected by a transverse member 17 which is pivoted at one end or which is otherwise removable for the purpose hereinafter explained. For some purposes hereinafter referred to, the upper transverse member 16 also, is pivoted or removable.

The rear end of the vehicle is normally closed by two hinged doors 18, each of which is hingedly connected to the rear end of the respective side wall in a manner which permits it to be swung from its normal closed position, through an angle of about 270°0 so that when fully open, it extends forwardly from the hinge and is disposed substantially in contact with the outer face of the respective wall.

Suitable provision is also made to enable the free inner edges of the two doors, when closed, to be secured firmly together in a manner which braces the open rear end of the rigid main frame of the body.

In the illustrated construction, the body is supported approximately midway between its ends by an opposed pair of transport wheels 20, mounted on stub axles, though it will be understood that, if desireed, any required number of spaced pairs of such wheels may be provided and that twin wheels may be used in circumstances where it is necessary to do so.

The lower part of the front of the body is provided centrally with a forwardly extending rigid A frame 21 provided with means for the pivotal attachment of the tow bar 22 of a tractor 24, the rear end portion only of which is shown in FIGS. 1 and 2.

A vertically adjustable horizontal floor 46 arranged within the body is suspended from the top of the latter by four flexible cables 30, one of which is arranged near each corner of the floor. Each of these cables has its lower end detachably connected to the floor for which purpose the cable end may be provided with a ring 31 for engagement with a corresponding pin 32 which projects laterally from the floor and which has a retaining flange on its free outer end.

The floor may be formed of suitable structural members covered with a deck of sheet metal.

Each cable 30 extends vertically upwards from the floor to and partly around a corresponding flanged pulley 34, rotatively mounted on an upper part of the respective side wall 10 of the body and the cables then extend horizontally forwards therefrom to a corresponding horizontal pulley 35 or 36 rotatively supported on the forward end of the respective side wall of the body.

The two cables which are thus passed partly around the pullies 35 then extend horizontally across the front upper part of the body to corresponding pullies 36. Thus there are two co-axial pullies 35 and four co-axial pullies 36 in the particular construction shown in the drawings.

Each of the four cables 30 then extends horizontally rearwards from its respective pulley 36 to a corresponding one of four co-axial horizontal pullies 38 which are freely mounted on a bracket secured to the free end of the plunger rod 40 which projects forwardly from a horizontal hydraulic cylinder 42 secured to the outer side of the respective side wall 10 of the body.

Finally, each cable after passing around its respective pulley 38 extended therefrom to an anchorage 44 on the side wall as shown in FIG. 1.

Thus by displacing the plunger of the hydraulic cylinder, the floor 4 may be raised and lowered as required, it being apparent that with the particular construction shown in the drawings, the vertical movement of the floor is twice the horizontal movement of the plunger of the hydraulic cylinder 46.

As the bottom of the vehicle body is open and entirely unobstructed, the floor 46 may be lowered until it rests on the ground at which time the several cables 30 may readily be detached therefrom after which the vehicle may be moved forwardly to leave the floor lying behind it on the ground.

A winch 50 which preferably is also hydraulically operated is mounted on the A frame at the forward end of the transport body and by means of a cable 52 thereon, the floor 46 when lying on the grounded behind the body may be pulled forwardly into the requisite position below the latter, so that the lifting cables 30 may be re-attached thereto which may then be raised to its normal position within the body. In order to facilitate this operation, the underside of the floor may be fitted with rollers, skids or the like to facilitatee its movement over the ground.

Although in the construction shown in the drawings provision is not made for guiding the floor 46 as it is raised and lowered within the body, it will be evident that such guide means may be provided, e.g. rollers may be mounted on each side of the floor for engagement with coacting vertical guide members, of channel shape in cross section, on the inner face of each side wall 10.

The right hand side wall 10 of the body is provided with a horizontal longitudinally extending conveyor, generally designated 48 and as shown best in FIG. 3 this conveyor overhangs the upper end of the respective side wall so that it does not obstruct the interior of the vehicle.

This conveyor comprises a centrally located endless chain 481 provided with spaced projecting lugs and two fixed horizontal rails 483 and 484 are arranged in spaced relationship on each side of the chain so as to form unobstruced longitudinal openings 49 between them.

This longitudinal conveyor projects forwardly beyond the front wall 10 of the vehicle body so that its projecting forward end may be disposed close to the upper end of an elevator conveyor 56 forming part of a conventional bale pick-up and elevator, of any suitable known construction, which is attached by outriggers to the corresponding side of the tractor 24.

Thus, the tractor, with the bale pick-up and elevator and transport vehicle attached thereto, may be driven over a field on which hay bales are lying, thereby to pick-up and elevate successive bales and deliver them onto the projecting forward end of the longitudinal conveyor 48 by which they are conveyed rearwardly on the body. The conveyor chain 48 is also preferably driven hydraulically in any suitable way.

The transport body is also provided with a horizontal transverse conveyor, generally designated 54, which is arranged at a higher level than the longitudinal conveyor 48 so as to be movable above it.

This transverse conveyor comprises a rigid frame 541, the opposite ends of which are provided with rollers which run on longitudinal rails on the upper ends of the opposed side walls 10 of the body and it may be moved along the latter either manually or by any suitable hydraulic or other power means.

The frame 541 supports a plurality of parallel conveyor rollers 542 which enables each bale to be freely pushed along the transverse conveyor to a required position at which it is desired to pull the bale laterally therefrom in order to deposit it on the floor 46.

In order to transfer each bale in turn from the longitudinal conveyor 48 to the transverse conveyor 54, the frame of the latter is provided with a spaced pair of inclined ramp bars 543 which extend forwardly and downwardly therefrom so that there free forward ends extend into the longitudinal spaces 49 between the respective pairs of longitudinal rails 483 and 484 included in the longitudinal conveyor 48.

Thus, as each bale, while being moved rearwardly on the longitudinal conveyor 48, encounters the ramp bars 543 on the adjacent end of the transverse conveyor 54, it is pushed up the ramp and into engagement with means by which it is turned through approximately 90° and directed onto the rollers 542 of the transverse conveyor 54.

Any suitable means may be provided for deflecting the successive bales from the longitudinal conveyor 48 onto the transverse conveyor 54. Thus, as shown in the drawings this operation may be performed by an inclined rotatable disc 58 which is mounted on the frame of the transverse conveyor in a position such that it receives each bale which is pushed upwardly over the ramp bars 543. This transfer disc may be continuously rotated by any suitable power means or it may be turned manually if desired or again it may be so arranged that it is turned automatically by the successive incoming bales. Alternatively a fixed bale deflector may be used for this purpose.

The manner in which the transport is used is illustrated diagrammatically in FIGS. 6 to 9 inclusive.

As previously explained, the transport is towed around a field whereby bales lying thereon may be successively picked up, elevated and delivered onto the forward end of the longitudinal conveyor 48.

At the outset of the operation, the floor 46 is raised to its full extent at which time the distance between it and the underside of the frame of the transverse conveyor may be only a little more than the depth of one layer of bales 60.

Thus, an operator standing on the floor and having control of the hydraulic operating apparatus by means of control valves arranged in any convenient position, may form successive transverse rows of bales on the floor until a complete layer or tier is formed thereon. It will be clear that either the foremost or the rearmost transverse layer may be formed first.

When the lowermost layer is formed in this way, the floor is lowered through a distance approximately equal to the depth of the layer after which a second layer is similarly formed thereon and FIG 6 shows the transport with two such layers on the floor.

These operations are repeated until the required number of layers of bales has been formed, after which the vehicle is towed to a position at which the load is to be deposited.

For this purpose, the floor 46 is lowered until it rests on the ground and the suspension cables 30 are then disconnected therefrom. The rear doors 18 are then opened as shown in FIG. 7, while also the rear lower transverse frame member 17 is detached, or swung clear of the opening.

The transport is then towed forwardly until its rear end is sufficiently clear of the bale stack to enable the doors 18 to be reclosed and fastened. See FIG. 8.

At this time, or previously, the winch cable 52 is connected to the forward end of the floor and the transport vehicle is moved rearwardly until the closed doors abut against the forward end of the stack on the floor.

The floor is then pulled forwardly relatively to the transport vehicle so that the stack of bales is progressively pushed from the rear of the floor and onto the ground as shown in FIG. 9.

Thus, after the entire stack of bales has been deposited on the ground in any convenient location and the floor is again correctly located below the transport body, the suspension cables 30 are reattached to the floor so that the entire operation may be repeated.

If desired, the stack of bales, instead of being deposited onto the ground as above described, may be discharged directly onto a conventional road or rail truck of the flat top type.

For this purpose the transport vehicle herein described requires to be sufficiently wide to straddle the flat top truck.

In order to transfer the stack, the transport vehicle is arranged in longitudinal alignment with the flat top truck after which the floor 46, which at that time is usually disposed close to the ground, may be raised by means of the suspension cables 30 until it is disposed above the level of the deck of the truck and during this lifting movement, the top of the bale stack moves upwardly through the open top of the vehicle.

The lower transverse frame member 17 at the rear of the transport vehicle is then removed, or swung clear, so that the vehicle may then be pushed rearwardly until it straddles the truck after which the floor 46 is lowered thereonto and is disconnected from the suspension cables 30.

At this time, or previously, the upper transverse frame member 16, at the rear of the vehicle, is removed or swung aside, so that the vehicle may then be towed away from the truck, leaving the floor and its stack of bales thereon.

Finally the floor 46 is again pulled back into the transport vehicle by means of the winch 50 and during this operation the stack is pushed from the floor in the manner previously described.

In order to support the floor 46 during this return movement, the side walls of the transport vehicle may be provided at the required height with normally retracted floor supporting means so that the latter may be projected to support the side edges of the floor until it is reconnected to the suspension cables 30.

I claim:

1. A transport vehicle for hay bales or other articles comprising a rigid body of rectangular shape supported on transport wheels, said body comprising spaced side walls and a forward end wall and being open at its rear end and also at the bottom, movable abutment means operable to extend across said open rear end of the body, a vertically movable floor within the body, power operated raising and lowering means therefor, means detachably connecting the floor to said raising and lowering means, and a substantially longitudinally extending conveyor supported in a laterally offset position adjacent the top of one of the side walls, thereby to facilitate distribution of the articles over the floor without substantially obstructing the interior space of the body, whereby the floor, after being raised to a position adjacent said conveyor, may be progressively lowered as successive layers of articles are stacked thereon and whereby, after the vehicle has been subsequently moved to a discharge position, the floor may be lowered until it rests on the ground or other supporting surface and may then be detached from said raising and lowering means, thereby to enable the vehicle to be moved forwardly leaving the floor and stack on the supporting surface behind the body, and wherein the vehicle includes means operable to pull the floor forwardly over the supporting surface to enable it to be re-attached to said raising and lowering means whereby, when said movable abutment means is so arranged as to extend across the rear end of the body, the stack of articles is progressively pushed, by said abutment means, over the rear end of the floor and onto the said supporting surface.

2. A transport vehicle according to claim 1, including a transverse conveyor extending across the top of the body between the side walls thereof, said transverse conveyor being movable longitudinally on the body and means for transferring the successive bales or other articles from the longitudinal conveyor to the transverse conveyor.

3. A transport vehicle according to claim 1 including a transverse conveyor extending across the top of the body between the side walls thereof and disposed above the level of the longitudinal conveyor and including ramp means over which each successive bale or other article is pushed whereby it is transferred to the transverse conveyor.

4. A transport vehicle according to claim 1 including a transverse conveyor extending substantially horizontally across the top of the body between the side walls thereof, said conveyor being movable longitudinally on the body from a position adjacent the open rear end thereof to a position at least partly forwardly of the front wall in which it does not substantially obstruct the interior space of the body, and means for transferring successive articles from the longitudinal conveyor to the transverse conveyor.

5. A transport vehicle according to claim 1 wherein said movable abutment means at the rear end of the body comprises at least one door.

* * * * *